United States Patent [19]

Broetto

[11] 4,313,102
[45] Jan. 26, 1982

[54] LEVEL SENSING DEVICE FOR DIELECTRIC LIQUIDS

[75] Inventor: Costantino Broetto, Milan, Italy

[73] Assignee: Fratelli Borletti S.p.A., Milan, Italy

[21] Appl. No.: 90,524

[22] Filed: Nov. 2, 1979

[30] Foreign Application Priority Data

Nov. 7, 1978 [IT] Italy .............................. 53869/78[U]

[51] Int. Cl.³ .......................................... G08B 21/00
[52] U.S. Cl. ...................................... 340/59; 73/295;
337/3; 337/102; 340/622
[58] Field of Search ....................... 340/59, 622, 620;
337/3, 85, 102, 370; 73/204, 295

[56] References Cited

U.S. PATENT DOCUMENTS

| 2,769,121 | 10/1956 | Rogoff | 340/622 X |
| 2,782,285 | 2/1957 | Cantlin | 340/622 X |
| 3,098,914 | 7/1963 | Giannino | 340/622 X |
| 3,171,934 | 3/1965 | Brennan et al. | 337/102 X |
| 3,335,243 | 8/1967 | Canaday | 340/622 X |
| 3,432,840 | 3/1969 | Neapolitakis et al. | 340/622 |
| 3,701,138 | 10/1972 | Pulliam et al. | 340/622 |
| 3,772,673 | 11/1973 | Szeverenyi | 340/622 X |
| 3,810,143 | 5/1974 | Lawson et al. | 340/622 X |
| 3,922,658 | 11/1975 | Harper et al. | 340/59 X |
| 3,932,852 | 1/1976 | Hill | 340/59 X |
| 3,939,470 | 2/1976 | Arai et al. | 340/59 |
| 3,962,665 | 6/1976 | Wojcik et al. | 337/102 |

FOREIGN PATENT DOCUMENTS 1183261 12/1964 Fed. Rep. of Germany ...... 340/622

Primary Examiner—John W. Caldwell, Sr.
Assistant Examiner—Joseph E. Nowicki
Attorney, Agent, or Firm—Frost & Jacobs

[57] ABSTRACT

A device (1) for sensing the presence of a dielectric liquid at a predetermined level in a tank is described. The main feature of device (1) is that it comprises a first and a second bimetallic strip (23, 44) disposed facing each other and a resistor (48) disposed in proximity to said second strip (14) at a level in said tank equal to said predetermined level.

10 Claims, 3 Drawing Figures

LEVEL SENSING DEVICE FOR DIELECTRIC LIQUIDS

BACKGROUND OF THE INVENTION

This invention relates to a level sensing device for dielectric liquids.

In particular, this invention relates to a device for sensing the presence of lubricating oil at a predetermined level in a collection tank disposed in a motor vehicle engine.

The lubricating oil level in a vehicle engine is generally checked by inserting a suitable rod into the tank and observing whether the oil wets the rod between two reference notches which indicate a minimum and a maximum level respectively.

In order to allow the oil to be checked without approaching the engine, sensor devices are at present used which automatically supply an electrical signal which depends on the presence of the oil at a predetermined level. These sensor devices are divided substantially into a first type for insertion into the tank through a bore already provided for introducing the rod, and a second type for housing at a predetermined level in a lateral wall of the tank.

In general, the sensor devices of the first type are rather bulky and consequently the said bore has to be enlarged in order to house them. In the case of devices of the second type, in addition to providing a transverse bore in the lateral tank wall, it is also necessary to use a bush or other seal means as the oil level must always exceed the level at which the device is located. Consequently, the use of such sensor devices is expensive because the labour cost for installing the device has to be added to its actual cost.

Furthermore, as the oil level can be checked either with the engine cold or hot, i.e. over a temperature range which can exceed from −40° C. to +150° C., it has been found that the measurements provided by present day devices are often influenced by the engine temperature.

SUMMARY OF THE INVENTION

The object of the present invention is to provide a level sensing device for the lubricating oil of a motor vehicle engine, by means of which the aforesaid drawbacks of known devices are overcome.

The present invention provides a device for sensing the presence of a dielectric liquid at a predetermined level in a tank, comprising a first and a second bimetallic strip disposed facing each other and arranged to activate electrical indicator means following the opening or closure of an electrical contact established between them, and a resistor disposed in proximity to said second strip at a level in said tank equal to said predetermined level; an electric current supply to said resistor determining a corresponding development of heat energy which, if the level of said liquid is less than said predetermined level, heats said second strip which bends to a greater extent than said first strip so opening or closing said electrical contact and activating said indicator means, whereas if said liquid exceeds said predetermined level, said heat energy is substantially dissipated by said liquid and therefore does not cause said indicator means to be activated.

BRIEF DESCRIPTION OF THE DRAWINGS

The present invention will be more apparent from the description given hereinafter by way of non-limiting example of a preferred embodiment thereof, with reference to the accompanying drawings, in which.

DETAILED DESCRIPTION OF THE INVENTION

Figure 1:
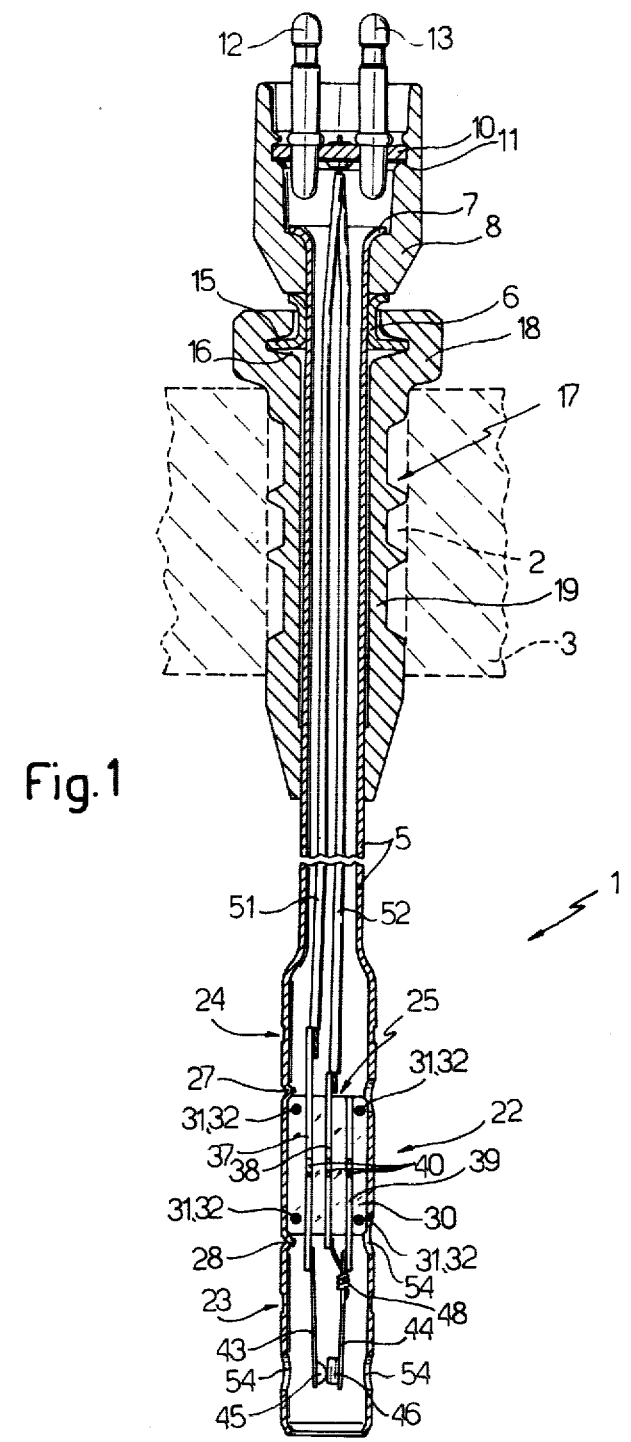
FIG. 1 is an elevation and sectional view of a sensor device according to the present invention.

FIG. 1 shows a sensor device indicated overall by 1 and inserted into a bore 2 provided in the upper wall 3 of a lubricating oil connection tank (not shown) of a motor vehicle engine. The sensor device 1 comprises a tubular shank 5, in proximity to the upper end of which there is connected a bush 6. Between this latter and the outwardly facing upper end 7 of the shank 5 there is fixed a cup member 8, in which is mounted an insulating board 10 which supports a printed circuit 11 and a pair of cylindrical pins 12 and 13.

On the side distant from the member 8, the bush 6 extends into a radial annular portion 15 which cooperates with a corresponding radial annular seat 16 in a tubular gasket 17 of substantially known type. The gasket 17 comprises an end portion 18 of widened cross-section, which acts as an axial stop for any movement of the shank 5 towards the inside of said tank, and also comprises a tubular portion 19 arranged to cooperate with the inner surface of the bore 2 to allow the shank 5 to be correctly positioned inside the tank.

At the end distant from the end which carries the cup member 8, the shank 5 extends longitudinally into a portion 22 of widened cross-section which comprises externally annular notches 23 and 24 which indicate the minimum level and maximum level respectively. A pair of semicylindrical elements 25 is positioned in the portion 22 between the notches 23 and 24 (see FIG. 2). These elements define overall a cylindrical member (not shown), the diameter of which is substantially equal to the inner diameter of the portion 22, and which is prevented from moving axially by a pair of radial annular ribs 27 and 28 on said portion 22, which extend inwards therefrom.

Figure 2:
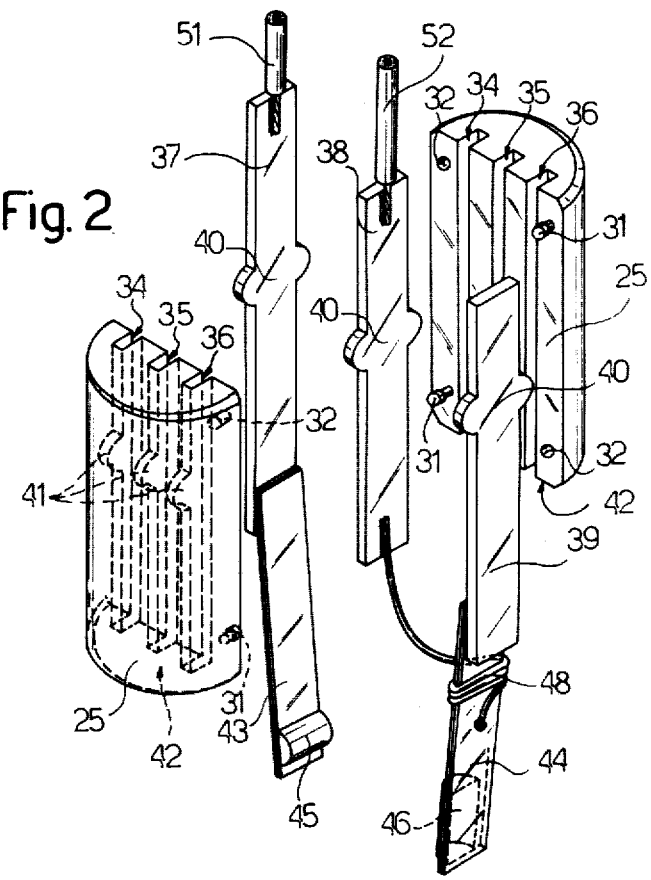
FIG. 2 is an exploded perspective enlarged view of a detail of FIG. 1.

With reference to FIG. 2, each semicylindrical element 25 comprises, at opposite corners of a respective transverse surface 30, a pair of projections 31 and a pair of seats 32. These latter are arranged to receive the projections 31 in order to enable the two said elements 25 to be snap-fitted together.

Each element 25 also comprises on said surface 30 three longitudinal slots 34, 35 and 36 respectively, defining seats for housing corresponding conducting plates 37, 38 and 39. Each of said plates is provided with an intermediate portion 40 of widened cross-section, which cooperates with corresponding seats 41 provided in the slots 34, 35 and 36 in such a manner as to prevent any axial movement of the plate along the slots.

With reference to FIG. 1, bimetallic strips 43 and 44 are welded to a first end of the plates 37 and 39 so that they extend longitudinally beyond the base surface 41 of each semicylindrical element, and to each free end of the strips there is connected a semicylindrical electrical contact element 45, 46. The strips 43 and 44 are formed from identical materials, for example iron and iron-nickel, and are disposed in such a manner that their free end rotates in an anti-clockwise direction on temperature increase. In addition, the distance between the strips 43 and 44 ensures that the elements 45 and 46 transmit to each other a sufficient force to enable an electrical contact defined thereby to be kept normally closed. Finally, the elements 45 and 46 are disposed at 90° to each other and are preferably constructed of an alloy which can operate permanently in lubricating oil at high temperature and possibly in a state of deterioration and/or contaminated with carbon and/or sulphur residues.

A resistance wire 48 of high resistivity is wound around the bimetallic strip 44 in proximity to the end welded to the plate 39. This wire is disposed at the beginning of that end of the strip 44 connected to the plate 39, and has a number of turns which is either small or concentrated over a small space. The resistance wire 48 has a first end connected to the bimetallic strip 44 and its second end connected to the plate 38.

At the end distant from the bimetallic strips 43 and 44, the plates 37 and 38 are connected by externally insulated conductor wires 51, 52 to the printed circuit 11 of the board 10, by way of which they are connected to the cylindrical pins 12 and 13 respectively.

As the proper operation of the device 1 requires that any heat produced by the resistance wire 48 can be correctly dissipated by the lubricating oil, a plurality of bores 54 is provided in the portion 22 of the shank 5 to facilitate convection motion of the lubricating oil as a result of the development of said heat.

Figure 3:
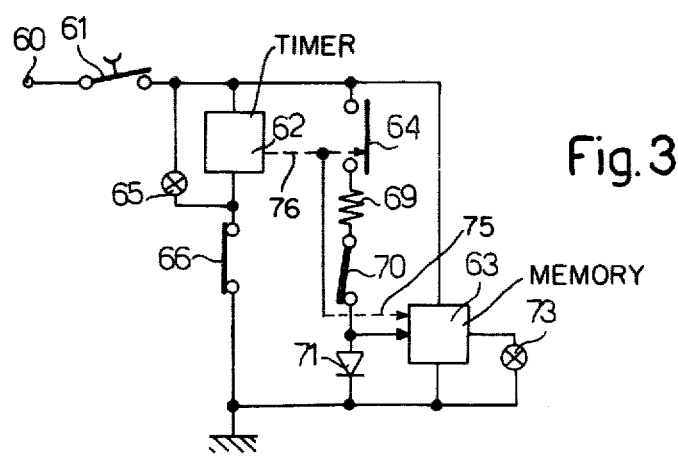
FIG. 3 is a diagram of an electrical circuit associated with the sensor device of FIG. 1.

With reference to FIG. 3, a connection terminal 60 is connected, in a manner not illustrated, to the positive pole of a direct current supply source, preferably the vehicle supply battery. The terminal 60 is connected via a switch 61, which can be operated for example by the vehicle ignition key, to the positive supply inputs of a timer circuit 62 and a memory circuit 63, to a first terminal of a normally open switch 64, the operation of which is controlled by the timer circuit 62, and to a first terminal of an indicator lamp 65 in the form of a normal indicator lamp disposed on the vehicle dashboard and relative to the said lubricating oil pressure. The second terminal of the indicator lamp 65 is connected to the negative supply input of the timer circuit 62, and is also connected to earth via a normally closed switch 66 in the form of a switch controlled by a device for determining the lubricating oil pressure.

The second terminal of the switch 64 is connected to earth via a resistor 69, a normally closed bimetallic switch 70 and a diode 71 connected in series. The resistor 69 of FIG. 3 corresponds to the resistance wire 48 shown in FIG. 1, and the bimetallic switch 70 corresponds in FIG. 1 to the bimetallic strips 43 and 44 with their contact elements 45 and 46.

The junction point between the switch 70 and the anode of the diode 71 is connected to the signal input of the memory circuit 63, an output of which is connected to earth via an indicator lamp 73, and the negative supply input of the memory circuit 63 is also connected to earth.

FIG. 3 does not show the means for zeroing the timer circuit 62 and memory circuit 63, these means acting automatically on said circuits when the electrical supply current is missing. However, FIG. 3 shows means by which the memory circuit 63 can receive the input signal only during a predetermined time period as established by the timer circuit 62. By way of example, memory 63 is provided with an enabling input 75 which is connected to an output 76 of timer 62. Thus, during the predetermined period of time, timer 62 generates a first value of output signal which enables memory 63 to receive the input signal, and after expiration of such predetermined period of time, timer 62 generates a second value of output signal which disables memory 63 from responding to any value of input signal.

The operation of the sensor device 1 is described hereinafter with particular reference to FIGS. 1 and 3.

It will be assumed that the device 1 is correctly inserted into the lubricating oil tank as partially shown in FIG. 1, and that it is required to check the oil level in said tank when said ignition key is rotated into a position in which the switch is closed but the vehicle engine is still at rest.

As the engine is at rest, the switch 66 associated with said device for determining the oil pressure is closed. The indicator lamp 65 is consequently lit and the timer circuit 62 is supplied. This latter immediately activates the memory circuit 63 such that it can receive the input signal for a predetermined period, for example three seconds, and closes the switch 64 through which direct current is supplied to the resistor 69, switch 70 and diode 71 connected in series. Across the diode there is therefore established a direct current voltage signal corresponding to a direct polarisation voltage value which is detected by the memory circuit 63 and determines at the output of said circuit a zero signal, on the basis of which the indicator lamp 73 remains extinguished.

With reference to FIG. 1, when the switch 64 is closed, an electric current flows from the plate 38 to the plate 37 through the resistance wire 48, the bimetallic strip 44, the contact elements 46 and 45 and the bimetallic strip 43. This current reaches the strips 43 and 44 to a substantially equal extent, and these generate an equal quantity of heat, consequently both bending simultaneously in the same direction (anti-clockwise) while maintaining a constant distance apart.

The strip 44 can however receive a further quantity of heat developed by the resistance wire 48 wound about it. This quantity of heat must be sufficient to enable the strip 44 to attain a considerably higher temperature (for example 300° C.) than the maximum temperature attainable by the lubricating oil (for example 150° C.), and over a period of time less than that determined by the timer circuit 62.

If the oil level is above the resistance wire 48, the quantity of heat developed by this latter is completely dissipated by the oil itself. Consequently, the strips 43 and 44 deflect by an equal amount, and the elements 45 and 46 remain in electrical contact.

With reference to FIG. 3, such an event corresponds to maintaining the bimetallic switch 70 closed. Consequently, there is still a voltage across the diode 71 corresponding to the direct polarisation voltage which, fed to the signal input of the memory circuit 63, keeps this latter in its initial condition. Consequently, the indicator lamp 73 remains extinguished.

On termination of the predetermined time period, the timer circuit 62 opens the switch 64 and at the same time makes the memory circuit 63 unable to receive any further input signal. Consequently (see FIG. 1), the resistance wire 48 and the bimetallic strips 44 and 43 are no longer traversed by current. These latter therefore assume a rest position in which both bend to an extent dependent on the temperature of the oil in which they are immersed. A similar event (opening of the switch 64) takes place if the engine is started before the time determined by the timer circuit 62. This happens because the electricity supply to this latter would be cut off by the normally closed switch 66 associated with the lubricating oil pressure sensing device.

If the oil level is lower than the level at which the resistance wire 48 is disposed, the heat produced by this latter during the time period determined by the timer circuit 62 causes the strip 44 to bend to a greater extent in an anticlockwise direction than the strip 43, and consequently the electrical contact between the elements 46 and 45 is opened. With reference to FIG. 3, this opening corresponds to the opening of the bimetallic switch 70, and causes a consequent reduction in the voltage across the diode 71 and at the input of the memory circuit 63. The output of this circuit therefore passes to a positive level, and is maintained at this level until zeroing takes place. The indicator lamp 73 therefore lights, to indicate insufficient oil level.

In the meantime, the opening of the electrical contact between the strips 44 and 43 has resulted in the electricity supply being cut off from the resistance wire 48, which has therefore been able to cool down and again cause the contact elements 46 and 45 of the respective strips to approach each other. If electrical contact between the elements 46 and 45 takes place before the period determined by the timer circuit 62, the resistance wire 48 again heats up, to again cause the contact between the strips 44 and 43 to open. This however does not bring about any change in the operation of the circuit of FIG. 3, as the memory circuit 63 keeps the indicator lamp 73 alight until it is zeroed.

The timer circuit 62 and memory circuit 63 are automatically zeroed when the engine is turned off, as a result of opening the switch 61 by the ignition key, which cuts off the electricity supply to the circuits 62 and 63.

From an examination of the characteristics of the device 1 according to the present invention, it is apparent that this device enables the aforesaid objects to be attained.

In particular, the use of the pair of bimetallic strips 43 and 44 constructed of identical materials enables perfect thermal compensation of the device 1 to be attained, in that they maintain a constant distance apart while varying their position relative to the portion 22 of widened cross-section in accordance with the temperature of the oil in which they are immersed. In this respect, any change in oil temperature causes only relative sliding in a longitudinal direction between the free ends of the strips 43 and 44, and consequent rubbing between the contact elements 45 and 46 carried thereby. There is therefore a continuous effective self-cleaning action by said contact elements, which at the same time do not wear as this action takes place in the presence of lubricating oil.

Besides determining the opening of the bimetallic switch 70 within the period set by the timing circuit 62, the circuit of FIG. 3 also indicates, by way of the memory circuit 63 and lamp 73, any interruption in the series circuit comprising the resistor 69, switch 70 and diode 71. More particularly (see FIG. 1), an indication is given of any interruption in the electrical continuity of the series circuit disposed between the pins 13 and 12 and comprising, in the stated order, the wire 52, the plate 38, the resistance wire 48, the bimetallic strips 44 and 43 with their contact elements 46 and 45, the plate 37 and the wire 51. Consequently, as it is also possible to manually check the oil level by checking whether the oil wets the portion 22 of the shank 5 between the notches 23 and 24, any incorrect indication of insufficient oil level would necessarily imply a fault in the sensor device 1 or more generally in the circuit of FIG. 3.

As the only purpose of the resistance wire 48 is to heat the bimetallic strip 44, it can be conveniently concentrated over a small space and therefore enable small variations in oil level to be determined.

Finally, the device 1 according to the present invention has a compact structure which in no way creates an obstacle, and consequently enables the bore already provided for passage of the normal oil checking rod to be used without requiring any further enlargement of said hole.

Finally, it is apparent that modifications can be made to the present invention without leaving the scope of the inventive idea.

For example, if the tank into which the shank 5 of the device 1 is to be inserted requires the use of a flexible rod which follows the inner configuration of the tank, a flexible sheath, in particular of the preloaded turn type, could be used instead of the shank 5 in order to prevent the tubular portion 22 interfering with any mobile member disposed in the tank.

From the description of operation of the device 1, it is apparent that the bimetallic strips 43 and 44 are heated directly as they are traversed by the current flowing through the resistance wire 48, and said wire heats the strip 44 indirectly. Even though the described embodiment of the device 1 enables the said objects to be attained, wide modifications are possible. For example, direct heating of the strips 43 and 44 could be dispensed with by using a third connection wire for the return of the supply current of the resistor 48, and possibly in such a case strips could be used which define a normally open contact.

On the basis of the principle illustrated for the device 1, a level indicator device could be formed by using a pair of bimetallic strips similar to those described but extending longitudinally over the entire distance between the said minimum and maximum notches, and winding on one of said strips a resistance wire over the entire length of said strip. In this manner, the heating time for said strip would depend on the amount of it which is immersed in the oil, and therefore an alternately positive and zero square wave electrical signal would be available at the pins 12 and 13 due to the rhythmic opening and closing of the electrical contact between said strips. In said signal, the ratio of the duration of the positive signal to the duration of the zero signal would be proportional to the time required for heating the bimetallic strip wound with resistance wire, and would thus depend on the portion of said strip lying above the level of the oil.

Finally, although the device 1 has been described with particular reference to checking the lubricating oil level in a vehicle engine tank, it is possible to use said device for checking the level of any type of liquid, provided it has dielectric properties.

What we claim is:

1. A device for sensing the presence of a dielectric liquid at a predetermined level in a tank, comprising first and second bimetallic strips having substantially identical thermal characteristics, each of said strips bearing an electric contact, said contacts forming a low resistance electrical path when said contacts are closed and a high resistance electrical path when said contacts are opened, said strips being adapted to be disposed in said tank in contact with the dielectric fluid at a level equal to said predetermined level; a source of electric current; a resistor connected between a switching element and one of said contacts and disposed in heat exchange proximity for heating said second strip; a timer circuit for periodically operating said switching element to provide current flow through said resistor; and a memory circuit having a signal input connected to the other of said contacts and an enabling input responsive to said timer circuit, said memory circuit providing an electrical output signal only when enabled by said timing circuit whenever a change in the resistive path between said contacts occurs, said device operating to produce said output signal when the level of liquid in the tank falls below said predetermined level.

2. A device as claimed in claim 1, wherein said contacts have facing surfaces which diverge from each other.

3. A device as claimed in claim 2, wherein said contacts comprise substantially semicylindrical structures.

4. A device as claimed in claim 3, wherein said contacts are disposed on said strips with their respective axes of symmetry perpendicular to each other.

5. A device as claimed in claim 1 including a pair of conducting plates, wherein each of said bimetallic strips has a fixed end connected to a respective conducting plate.

6. A device as claimed in claim 5 including a pair of support elements each having a longitudinal slot, wherein said conducting plates are disposed in a respective pair of said longitudinal slots provided in facing walls.

7. A device as claimed in claim 1, wherein the strip connected with said input of said memory circuit is said first strip; and including signal means producing a sensible signal, said memory circuit output being connected to said signal means.

8. A device as claimed in claim 1, wherein said resistor has one end electrically connected with the contact of said second strip.

9. A device as claimed in claim 8, wherein said resistor is connected in series with said second strip.

10. A device as claimed in claim 1, including a diode connected in parallel to said signal input of said memory circuit for limiting the voltage input to said memory circuit.

* * * * *